July 20, 1954
G. A. BRACE
2,684,128
SUCTION CLEANER FILTER ASSEMBLY
Filed Nov. 2, 1951
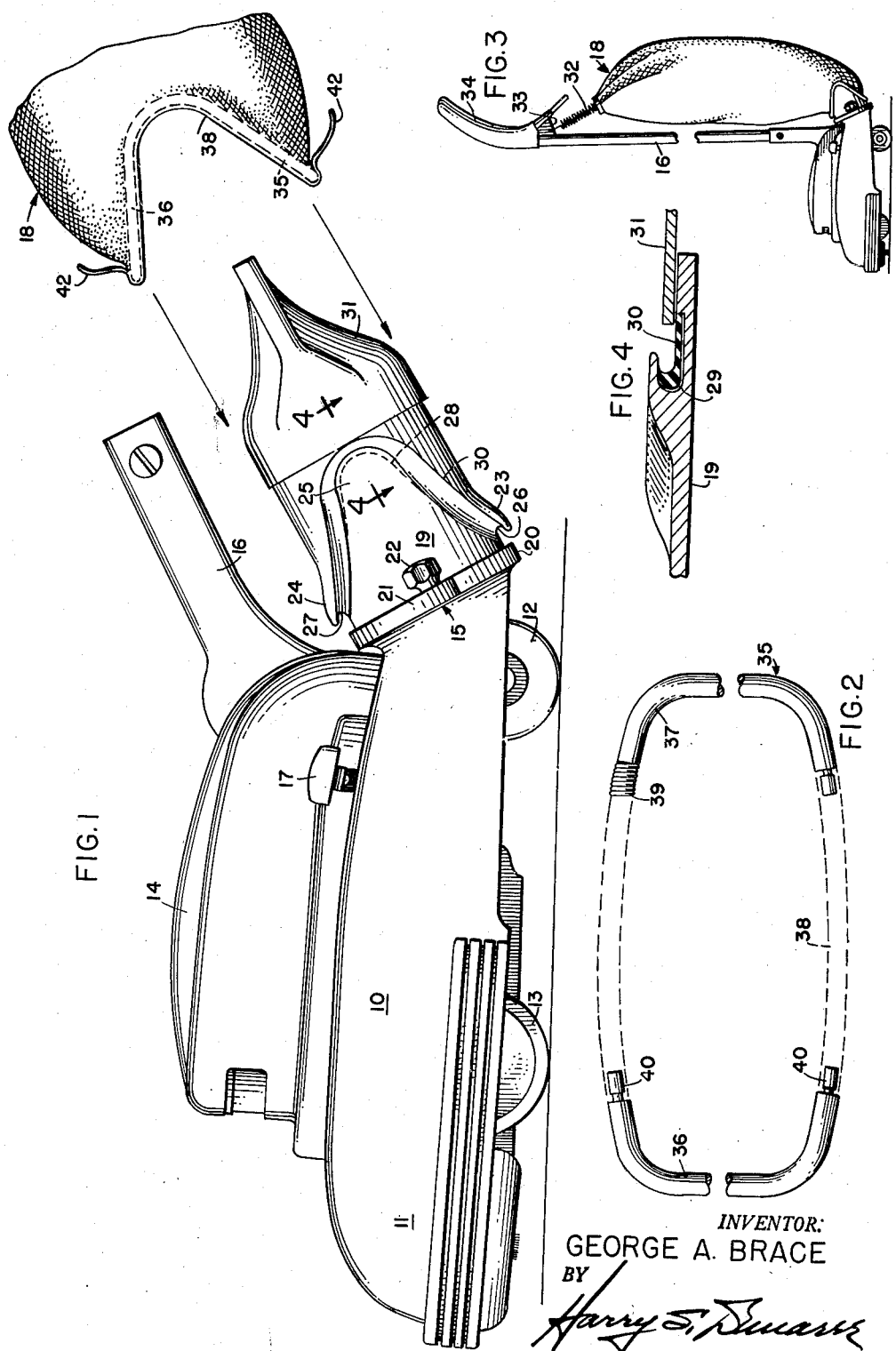
INVENTOR:
GEORGE A. BRACE
BY
Harry S. Duane
ATT'Y

Patented July 20, 1954

2,684,128

UNITED STATES PATENT OFFICE 2,684,128

SUCTION CLEANER FILTER ASSEMBLY

George A. Brace, Highland Park, Ill., assignor to The Hoover Company, North Canton, Ohio, a corporation of Ohio Application November 2, 1951, Serial No. 254,548

16 Claims. (Cl. 183—51)

This invention relates to a new and improved suction cleaner and more particularly to a simplified filter bag and adapter therefor.

One of the most vexatious and disagreeable chores attending the use of suction cleaners is that of emptying the filter bag. The filter constructions heretofore proposed fall into two general categories each of which presents disadvantages which are overcome by the present invention.

The commonly used filter falls within the first category and comprises a tubular bag having its lower, inlet end attached to the cleaner exhaust through a bag ring. Its upper end has an expansible opening normally held closed by a spring clip device. This type of filter is emptied by disconnecting the filter from the cleaner, removing the spring clip and shaking the dirt through the expansible top opening with the result that the fine dirt escapes as a cloud of dust engulfing the operator. Moreover, re-folding the top of the filter and replacing the clip must be done with considerable skill. Mechanical inept housewives often fail to perform this operation properly with the result that an imperfect seal allows fine dust to escape into the room unnoticed or, not infrequently, the air pressure dislodges the clip and blasts the contents of the filter into the room.

The second category of prior filters includes complex and costly arrangement for removing the dirt through the side wall of the bag either by means of a specially designed opening and closure therefore, or by means of a detachable dirt container. Although a great variety of these have been proposed, all are accompanied by so many disadvantages that none have enjoyed commercial success.

The present invention provides an extremely simple low cost filter which avoids the above mentioned and other shortcomings of prior constructions. Thus, my unique filter is provided with a single opening which serves as the dirt inlet as well as the opening through which the dirt is removed after the bag has been detached from the cleaner. The single opening is provided with a unique clamping device which encircles a tortuous seating groove when in place on the cleaner and yet one which is adapted to be readily flattened into a common plane having an area substantially equal to that of the cross sectional area of the filter body during the filter emptying operation.

Accordingly, it is an object of the invention to provide a novel suction cleaner construction.

Another object is the provision of a simplified filter bag for a suction cleaner.

Yet another object is the provision of a filter bag having a built-in clamping device which is self-adjusting to a tortuous seat on the cleaner exhaust and which readily opens to a wide area to facilitate emptying of the filter.

A further object of the invention is the provision of a filter bag having an inlet opening which can be readily enlarged into a common plane to facilitate the removal of the filter contents and easily restored to a semi-collapsed position to embrace and clamp the filter to a complementarily shaped seat on the cleaner exhaust.

Still other objects and advantages of the invention will become apparent from the following specification and accompanying drawings of an illustrative embodiment of the invention, in which:

Figure 1 is a side view of a floor type suction cleaner incorporating the invention and showing the mouth of the filter displaced from the adapter coupling;

Figure 2 is a plan view of the flexible clamping frame for the filter mouth before being assembled in the filter mouth;

Figure 3 is a view of the assembled cleaner ready for operation; and

Figure 4 is an enlarged sectional view along line 4—4 on Figure 1 showing details of the gasket against which the filter clamping frame seats.

Referring to Figures 1 to 4, it will be observed that the invention is shown as incorporated in a floor type suction cleaner having a main body casting 10 provided with a downwardly directed suction nozzle 11 across its forward end. This body is supported on a pair of rear wheels 12 and a pair of front carrier wheels 13 positioned immediately rearward of the rear wall of the nozzle. A vertical axis motor-fan unit of conventional type will be understood to be supported by the main body and enclosed by the removable motor hood 14. The fan chamber is formed within the main body 10 and is provided with a fan eye communicating with the suction nozzle. The exhaust air conduit extends rearwardly through the body and discharges through an upwardly inclined opening underlying the cleaner propelling handle 16. This handle is pivotally connected to the cleaner body through a bracket enclosed by the motor hood. Any convenient handle control means, such as the foot pedal 17, may be provided for controlling the position of the handle in accordance with usual practice.

The filter assembly forming an important feature of the invention comprises a cloth filter bag 18 and a filter adapter 19 as principal components. Adapter 19 consists of a partially flattened tubular member having its longer axis extending crosswise of the cleaner body. The base 20 of this conduit carries integral ears 21 at its opposite sides having downwardly opening slots to receive the threaded studs for thumbnuts 22 which releasably clamp the adapter to the exhaust outlet. Adapter 19 can be formed of metal or moulded from a plastic material and its outer surface is provided with grooved filter mouth seating lugs, as clearly shown in Figures 1 and 4. One pair of lugs 23 and 24 extend across the lower and upper walls of the adapter near its inlet end while a second pair 25, 25 are similarly disposed at the opposite sides of the adapter near the discharge end. Lugs 23 and 24 have downwardly opening seating grooves 26 and 27 respectfully suitably shaped to receive and firmly seat the filter clamping frame installed in the mouth of the filter bag. As herein illustrated, grooves 26 and 27 have a major portion of their length extending in a straight line crosswise of the adapter although it will be appreciated that these grooves may be arcuate if desired. The upwardly opening arcuate grooves 28 provided in lugs 25 disposed at either side of the adapter are similar in structure and purpose to grooves 26 and 27.

Although it is not essential, it is preferable to provide the adapter with a tortuous channel 29 which includes a portion of grooves 26, 27 and 28 and interconnects these grooves to form a seat for a sponge rubber gasket 30. The clamping frame for the filter mouth seats against this gasket in an air-tight manner as will be explained below.

Seated over the discharge end of the adapter is a flexible thin-walled tubular member 31 which acts as a valve to prevent dirt in the filter bag from falling back into the adapter and fan chamber. This valve may be secured to the end of the adapter in any well known manner and its discharge end is so shaped or restrained that the upper and lower walls collapse toward one another when the cleaner is not in operation. However, when the cleaner is operating the air pressure extends the walls to provide an unrestricted passageway into the filter bag.

Filter bag 18 comprises a tubular, air pervious cloth bag having its upper end gathered and permanently closed to which a suspension spring 32 is anchored. The upper end of the spring is detachably supported in a hook 33 carried on handle 16 just below grip portion 34.

The lower end of the filter bag is tailored to provide an opening having the general configuration illustrated in Figure 1. The edges of the opening are turned inwardly so as to enclose and support the clamping frame 35. The inturned edges are of course stitched or otherwise secured to the side walls of the filter. Referring to Figure 2 it will be seen that frame 35 comprises a pair of similar U-shaped members 36 and 37 the grooved ends 40 of which are joined by a pair of coil springs 38 and 39. Before assembly in the filter, all parts of clamping frame 35 lie in a common plane and enclose an area substantially equal to the cross sectional area of the filter body. However, the peripheral length of clamp 35 before mounting on the adapter is somewhat less than its length after mounting for reasons which will become obvious below. The clamp is sewn into the mouth of the filter so that springs 38 and 39 occupy the arcuate portion of the mouth at either side of the filter, as is clearly evident from Figure 1. Strong tape tabs 42, 42 may be secured to the mid-portion of members 36 and 37 so that their free ends may be grasped by the operator when assembling or disassembling the filter.

*Operation*

The operator assembles the filter on the adapter by grasping tabs 42, 42 in either hand and holding the bag frame approximately in the position illustrated in Figure 1. The bag mouth is then inserted downwardly over the adapter and one of the U-shaped members is placed in groove 26 or groove 27. Springs 38 and 39 are then seated in grooves 28, 28 at either side of the adapter and tensioned until the other U-shaped member over-rides the lug forming the other retaining groove, preferably groove 27. Springs 38 and 39 are now under considerable tension and act to hold the filter mouth firmly engaged in grooves 26, 27 and 28 and in airtight seating engagement with the rubber gasket 30. The upper end of filter suspension spring 32 is then placed over hook 33 on the back of the handle to complete the assembly of the filter to the cleaner.

The cleaner is now ready for operation and may be employed to clean carpets in the usual manner. As soon as the motor is turned on the air pressure produced by the suction fan opens valve 31 allowing the dirty air stream to enter the filter. Whenever the motor is de-energized the valve closes thereby preventing the dirt from falling down into the exhaust air conduit.

The filter can be emptied very easily and without the likelihood of dust and dirt escaping into the room by unhooking spring 32 from the handle and releasing the filter mouth from the adapter. In performing the latter operation the operator merely grasps either of tabs 42 and pulls downwardly sufficiently to disengage the associated U-shaped member from one of the grooves. Best results are obtained by disengaging the upper U-shaped member from groove 27 and thereafter disengaging the lower half of the clamp from groove 26. Lying the filter on its side, the operator then opens the clamp to its fully extended position, places it flat upon a sheet of paper and steps upon the tabs or the frame to hold the mouth sealed against the paper while she empties the bags contents onto the paper. After waiting a moment for the dust to settle, she lifts the bag from the pile of dirt and replaces it on the adapter following the procedure outlined in detail above.

An alternate method of emptying which is preferred by many users and has the advantage of avoiding the likelihood of dirt spillage is carried out as follows: The operator unhooks the upper end of the spring from the handle and then loosens thumbnuts 22, 22 to release the entire filter assembly for removal from the cleaner. Placing the assembly on a sheet of paper, the operator grasps the adapter in one hand and the uppermost of tabs 42 in the other to disengage the filter. The remainder of the emptying operation is then carried out as described above.

It will be obvious that the clamping frame may be made in various ways other than that specifically described and illustrated. For example, the major portion or even the entire frame may comprise an endless coil spring, or an elastic band. Another eminently satisfactory construction avoids the use of a continuous frame while retaining its principal advantages. Thus, the opposite lowermost edges of the mouth may be provided with short stiffening members for seating engagement with grooves 26 and 27 while the indented or hinge-like portions of the mouth are gathered axially of elastic members extending along the edge of this portion of the mouth and having their ends secured to the filter. The elastic members are of course positioned to seat in grooves 28 at the sides of the adapter and serve the same purposes as do springs 38 and 39 of the continuous clamping frame.

It will also be apparent that the adapter need not be made detachable and that it can form an integral part of the cleaner body. Moreover, the invention is applicable to cleaner constructions of a great variety of designs and dispositions of the component parts, as will be readily appreciated from the foregoing disclosure of a preferred embodiment of the invention.

While I have shown but a single modification of my invention it is to be understood that this modification is to be taken as illustrative only and not in a limiting sense. I do not wish to be limited to the particular structure shown and described but to include all equivalent variations thereof except as limited by the scope of the claims.

I claim:

1. A filter adapter for use in detachably coupling the inlet of a filter bag to a suction cleaner comprising, a substantially rigid tubular member open at either end, the inlet end being adapted to communicate with the exhaust side of a suction cleaner fan and the outlet end being adapted to open into a dirt filtering bag, a serpentine groove in the outer surface of said adapter extending thereabout and having a length much greater than the circumference of said adapter, said serpentine groove forming alternately disposed hills and dales, lugs projecting crosswise of the dale portions of said groove toward the inlet end of said adapter, and lugs projecting crosswise of the hill portions of said groove toward the outlet end of said adapter and cooperating with said first mentioned lugs to hold the inlet rim of a filter bag seated in said serpentine groove.

2. A filter adapter as defined in claim 1 including resilient gasket means seated in said serpentine groove against which the rim of a filter inlet can seat when in place on said adapter to form an airtight seal.

3. A filter adapter as defined in claim 1 wherein said serpentine groove includes a pair of hill portions and a pair of dale portions, each of said pairs being disposed on opposite sides of said adapter and with said pair of dales being disposed between said pair of hill portions.

4. A filter adapter for use in detachably coupling the inlet of a filter bag to a suction cleaner comprising, a tubular member having an inlet end and an outlet end, a pair of lugs on the opposite sides of said adapter adjacent said inlet end, a pair of lugs on the opposite sides of said adapter adjacent said outlet end and oriented 90 degrees from said first pair of lugs, a groove extending across the ends of each of said lugs on the end thereof facing toward the adjacent end of said adapter whereby the inlet rim of a filter bag having a length substantially equal to the length of a serpentine line encircling said adapter by way of each of said grooves taken in order can be seated and retained in place on said adapter.

5. A filter bag for use on a suction cleaner comprising, a tubular envelope of air pervious cloth material closed at one end and having a large diameter inlet opening at its opposite ends, reinforcing means secured to the marginal rim of said inlet opening, said reinforcing means including a pair of elongated rigid members disposed on the opposite sides of said inlet, and a pair of elongated resilient tension members having their opposite ends connected one to an adjacent end of each of said rigid members to form a reinforced rim for said filter inlet consisting of interconnected alternately disposed rigid and resilient members.

6. A filter bag for use on a suction cleaner as defined in claim 5 wherein said rigid reinforcing members are of arcuate shape arranged in the opposite sides of said inlet rim with their juxtaposed ends facing one another in spaced apart relation.

7. A filter bag for use on a suction cleaner as defined in claim 6 wherein said resilient members comprising coiled wire springs having their opposite ends anchored to the juxtaposed facing ends of said arcuate rigid members.

8. In combination, a filter assembly for use on a suction cleaner comprising, a tubular adapter having an inlet opening and an outlet opening at its opposite ends, a filter seating groove extending around the exterior of said adapter in a serpentine path having a length much greater than the circumference of said adapter, said groove having a plurality of retaining flanges at spaced intervals therealong and alternately disposed on opposite sides of said groove, a tubular filter bag provided with an inlet opening having a peripheral length much greater than the circumference of said adapter and of approximately the same length as said serpentine groove, and reinforcing means secured along the rim of said inlet opening including a resilient flexible tension means whereby said inlet may be deformed to a shape corresponding to said serpentine groove as it is seated on said adapter and held in place thereon by said resilient tension means in cooperation with said retaining flanges.

9. In combination, a filter assembly for use on a suction cleaner comprising a tubular filter bag of air pervious material closed except for an inlet opening, said inlet opening having a cross sectional area generally similar to the cross sectional area of the body portion of said filter, reinforcing means extending along the rim of said inlet opening including a resilient flexible tension member which can be readily deformed to form a mouth having a pair of arcuate lips lying in planes inclined to one another and merging adjacent the two corners of said mouth, said flexible tension members extending around the corners of said mouth and forming hinges for said mouth about which said arcuate lips may be pivoted toward and away from one another, a tubular adapter open at its opposite ends and adapted to have one of said ends connected to the exhaust air passage of a suction cleaner and having an external circumference much shorter than the circumference of said filter inlet opening, said adapter having seating means on the opposite sides thereof for receiving and seating the hinged corners of said filter inlet, and said adapter having means spaced axially therealong from said first mentioned seating means and oriented at right angles thereto for receiving and seating the arcuate pair of lips of said filter inlet and cooperating with the first mentioned seating means to provide an airtight seal between said adapter and the mouth of said filter bag.

10. A filter assembly for use on a suction cleaner of the type having a wheel supported main body provided with a suction nozzle at its forward end, a motor-driven suction fan communicating with said nozzle and having a rearwardly directed exhaust air passage, and a propelling handle pivotally supported on said main body, said filter assembly comprising a tubular filter adapter having an inlet for connection to the exhaust air passage of the cleaner, an air pervious filter bag closed except for a large area inlet mouth having arcuate lips hingedly connected together at the opposite sides of said mouth and adapted to be detachably seated about said adapter, said arcuate lips lying in planes inclined to one another and being shaped to embrace said tubular adapter in an airtight manner when moved toward one another from the opposite sides of said adapter, and means on the exterior of said adapter conforming in contour with the inlet mouth of said filter and including means for detachably engaging said inlet and holding said filter seated thereon in an airtight manner.

11. A filter assembly as defined in claim 10 wherein the rim of said filter inlet mouth is provided with a flexible, resilient tension member extending therealong and wherein the circumferential length of said rim when disassembled from said tubular adapter is less than the circumferential length of the filter seating area on said tubular adapter whereby said tension member cooperates with said engaging means on the adapter in holding the filter seated thereon in an airtight manner.

12. A filter assembly for use on a suction cleaner comprising, a rigid tubular adapter having an inlet end adapted to be connected to the exhaust side of a suction fan and an outlet end adapted to discharge into a filter bag, an air pervious filter bag provided with an inlet opening having a circumferential length much greater than the circumference of said adapter, a pair of rigid U-shaped lips secured to the rim of said filter inlet, means hingedly interconnecting the juxtaposed ends of said U-shaped lips to form a reinforced mouth at said filter inlet adapted to be opened to a position in which said lips lie in a common plane and closed toward one another so as to embrace the opposite sides of said tubular adapter, filter seating means extending along the opposite sides of said adapter at an angle to the axis thereof and against which the hinged lips of said filter inlet are adapted to seat, and means for detachably holding the reinforced mouth of said filter inlet in airtight engagement with said adapter.

13. A dirt filtering bag for use on a floor type suction cleaner, said bag comprising an elongated air pervious tubular envelope closed except for an air inlet opening at one end thereof, said inlet opening being formed by notching the opposite sides of said bag from the inlet rim thereof to form a partially open fish-like mouth having a pair of corners at the inner ends of said notches and interconnecting the adjacent ends of a pair of U-shaped lips defined by the rim edges of said inlet opening, reinforcing means secured to the marginal edges of said mouth and including resilient hinging means at the corners of said mouth, the area of said mouth when opened to lie in a plane being substantially as great as the cross sectional area of the body of said tubular envelope whereby dirt may be removed therethrough easily by shaking said filter while said mouth is held flattened against a dirt receiving surface.

14. A dirt filtering bag as defined in claim 13 in which said reinforcing means for said mouth includes rigid members along the forward lip portions of said mouth and resilient hinging means at the rearward or corner portions of said mouth whereby said mouth may be opened so that all portions thereof lie in a common plane during emptying operations and whereby at other times said mouth may be partially closed to embrace the sides of a filter adapter coupling in an airtight manner.

15. A dirt filtering bag as defined in claim 14 including finger engaging members secured to the lip portions of said mouth to facilitate the opening and closing of said mouth and the mounting of said filter on a filter adapter coupling.

16. A dirt filtering bag as defined in claim 14 in combination with a filter adapter coupling comprising an open ended tubular member, a pair of grooves on the opposite sides near to and facing one end thereof shaped to receive and seat the corner portions of said mouth, and a pair of grooves diametrically opposed to said first pair of grooves located near to and facing the other end of said tubular member shaped to receive and seat the lip portions of said mouth, both pairs of said grooves being so disposed that said resilient hinging means in the corners of said mouth cooperate with said grooves in holding said mouth seated on said adapter in an airtight manner.

References Cited in the file of this patent

UNITED STATES PATENTS

| Number | Name | Date |
| --- | --- | --- |
| 589,216 | McKee | Aug. 31, 1897 |
| 1,553,076 | Halstead | Sept. 8, 1925 |
| 1,774,589 | Broeske | Sept. 2, 1930 |
| 1,832,846 | Gudka | Nov. 24, 1931 |
| 1,949,052 | Kirby | Feb. 27, 1934 |
| 1,952,014 | Kirby | Mar. 20, 1934 |
| 2,159,116 | Zacharias | May 23, 1939 |
| 2,221,746 | Kirby | Nov. 12, 1940 |
| 2,295,981 | White | Sept. 15, 1942 |
| 2,599,520 | Turner | June 3, 1952 |
| 2,637,410 | Martin et al. | May 5, 1953 |